(12) United States Patent
Liu et al.

(10) Patent No.: US 12,211,149 B2
(45) Date of Patent: Jan. 28, 2025

(54) DRIVE ASSIST APPARATUS, DRIVE ASSIST METHOD, AND DRIVE ASSIST SYSTEM

(71) Applicant: HITACHI, LTD., Tokyo (JP)

(72) Inventors: Hang Liu, Tokyo (JP); Akihiko Hyodo, Tokyo (JP); Hidenori Sakaniwa, Tokyo (JP)

(73) Assignee: HITACHI, LTD., Tokyo (JP)

( * ) Notice: Subject to any disclaimer, the term of this patent is extended or adjusted under 35 U.S.C. 154(b) by 304 days.

(21) Appl. No.: 17/678,310

(22) Filed: Feb. 23, 2022

(65) Prior Publication Data

US 2022/0270328 A1 Aug. 25, 2022

(30) Foreign Application Priority Data

Feb. 25, 2021 (JP) .................................. 2021-028497

(51) Int. Cl.
*G06T 19/00* (2011.01)
*G06T 7/285* (2017.01)
(Continued)

(52) U.S. Cl.
CPC ............ *G06T 19/003* (2013.01); *G06T 7/285* (2017.01); *G06T 7/70* (2017.01); *G06V 10/755* (2022.01);
(Continued)

(58) Field of Classification Search
CPC ......... G06T 19/003; G06T 7/285; G06T 7/70; G06T 2207/30261; G06T 2210/21;
(Continued)

(56) References Cited

U.S. PATENT DOCUMENTS

| | | | |
|---|---|---|---|
| 2020/0272151 A1* | 8/2020 | Endo | G05D 1/0297 |
| 2021/0207974 A1* | 7/2021 | Zhou | G01C 21/206 |
| 2021/0256245 A1* | 8/2021 | Li | H04N 13/282 |

FOREIGN PATENT DOCUMENTS

| | | | |
|---|---|---|---|
| JP | 2013-205954 W | | 10/2013 |
| JP | 2014056506 A | * | 3/2014 |

OTHER PUBLICATIONS

Chinese Office Action received in corresponding Chinese Application No. 202210170264.6 dated Nov. 29, 2024.

* cited by examiner

*Primary Examiner* — Edward F Urban
*Assistant Examiner* — Jongbong Nah
(74) *Attorney, Agent, or Firm* — MATTINGLY & MALUR, PC

(57) ABSTRACT

A drive assist apparatus includes a storage unit that stores a three-dimensional model indicating a moving region, an input unit that receives, from a sensor group installed in the moving region, first height information indicating a first height which is a height of the mobile object and second height information indicating a second height which is a height of an object that satisfies a predetermined distance criterion from the mobile object, an extraction unit that extracts, from the three-dimensional model, a first plan view based on the first height information and a second plan view based on the second height information, a generation unit that generates a combined map for two-dimensionally showing the moving region and assisting the driving of the mobile object by combining the first plan view and the second plan view, and an output unit that transmits a generated combined map to the mobile object.

9 Claims, 10 Drawing Sheets

(51) Int. Cl.
*G06T 7/70* (2017.01)
*G06V 10/75* (2022.01)
*G06V 10/77* (2022.01)

(52) U.S. Cl.
CPC .................... *G06V 10/7715* (2022.01); *G06T 2207/30261* (2013.01); *G06V 2201/07* (2022.01)

(58) Field of Classification Search
CPC ............ G06T 2219/008; G06V 10/755; G06V 10/7715; G06V 2201/07; G06V 20/58; G06V 20/64; G05D 1/0282; G05D 1/0214; G05D 1/0221
See application file for complete search history.

DRIVE ASSIST APPARATUS, DRIVE ASSIST METHOD, AND DRIVE ASSIST SYSTEM

CROSS-REFERENCE TO RELATED APPLICATIONS

The present application claims priority to Japanese Patent Application No. 2021-028497, filed Feb. 25, 2021. The contents of this application are incorporated herein by reference in their entirety.

BACKGROUND OF THE INVENTION

1. Field of the Invention

The present disclosure relates to a drive assist apparatus, a drive assist method, and a drive assist system.

2. Description of the Related Art

In recent years, technologies related to autonomous driving have gradually appeared. Further, there is a need for further improvement of automatic driving functions of a mobile object. Among the automatic driving functions, the safety of the mobile object is one of the most important performances.

In order for the mobile object such as an electric wheelchair or a mobile robot to move efficiently in a moving region, it is necessary to accurately determine interference between the mobile object and an obstacle. When the interference between the mobile object and the obstacle can be accurately determined, the mobile object can pass in the vicinity of the obstacle, and as a result, the mobile object can freely move in the moving region.

In the related art, various proposals for determining the interference between the mobile object and the obstacle have been performed.

JP 2014-56506 A is one of means for determining the interference between the mobile object and the obstacle. JP 2014-56506 A describes a technology that "An obstacle detection device includes a mobile object shape storage unit 48 that stores a shape of a mobile object, an obstacle storage unit 46 that stores a position and a shape of an obstacle within a moving region, and an interference determination unit 38 that determines information between the mobile object and the obstacle based on positional information of the mobile object, the shape of the mobile object stored in the mobile object shape storage unit, and the position and the shape of the obstacle stored in the obstacle storage unit. The mobile object shape storage unit stores, for each layer when the mobile object is divided into a plurality of layers in a height direction, the shape of the mobile object in each layer. The obstacle storage unit stores, for each of the plurality of layers, a two-dimensional map that stores the position and the shape of the obstacle in the layer. The interference determination unit determines, tor each of the plurality of layers, the interference between the mobile object and the obstacle by using the shape of the mobile object in the layer and the two-dimensional map of the obstacle in the layer".

SUMMARY OF THE INVENTION

In JP 2014-56506 A, the mobile object including a three-dimensional scan type distance sensor or the like that measures a distance to the obstacle within the moving region creates a two-dimensional map showing the position and the shape of the obstacle within the moving region based on measurement data acquired by the distance sensor, and then determines the interference between the mobile object and the obstacle by using the created two-dimensional map.

However, in JP 2014-56506 A, since the mobile object needs to include various sensors used for detecting the obstacle, the cost of the mobile object is high, and the determination of the interference between the mobile object and the obstacle is performed by a local device having a limited number of computing resources. Thus, the accuracy of the interference determination is limited.

Therefore, there is a need for drive assist means that can be used for a mobile object not including a sensor and assists driving of the mobile object while suppressing a processing load on a mobile object side.

Therefore, an object of the present disclosure is to provide a drive assist means that can be used for a mobile object not including a sensor and for assisting driving of the mobile object while suppressing a processing load on a mobile object side.

In order to solve the above problems, one representative drive assist apparatus according to the present invention is a drive assist apparatus for assisting driving of a mobile object that moves within a moving region. The apparatus includes a storage unit that stores at least a three-dimensional model indicating the moving region, an input unit that is able to receive, from a sensor group installed in the moving region, first height information indicating a first height which is a height of the mobile object and second height information indicating a second height which is a height of an object that satisfies a predetermined distance criterion from the mobile object, an extraction unit that extracts a first plan view from the three-dimensional model based on the first height information and extracts a second plan view from the three-dimensional model based on the second height information, a generation unit that generates a combined map for two-dimensionally showing the moving region and assisting the driving of the mobile object by combining the first plan view and the second plan view, and an output unit that is able to transmit a generated combined map to the mobile object.

According to the present disclosure, it is possible to provide drive assist means that can be used for the mobile object not including the sensor and that assists the driving of the mobile object while suppressing the processing load on the mobile object side.

Other objects, configurations, and effects will be made apparent in the following description of the preferred embodiments.

DESCRIPTION OF THE PREFERRED EMBODIMENTS

Hereinafter, an embodiment of the present invention will be described with reference to the drawings. Note that, the present invention is not limited to this embodiment. Further, in the description of the drawings, the same parts are indicated by the same reference signs.

Figure 1:
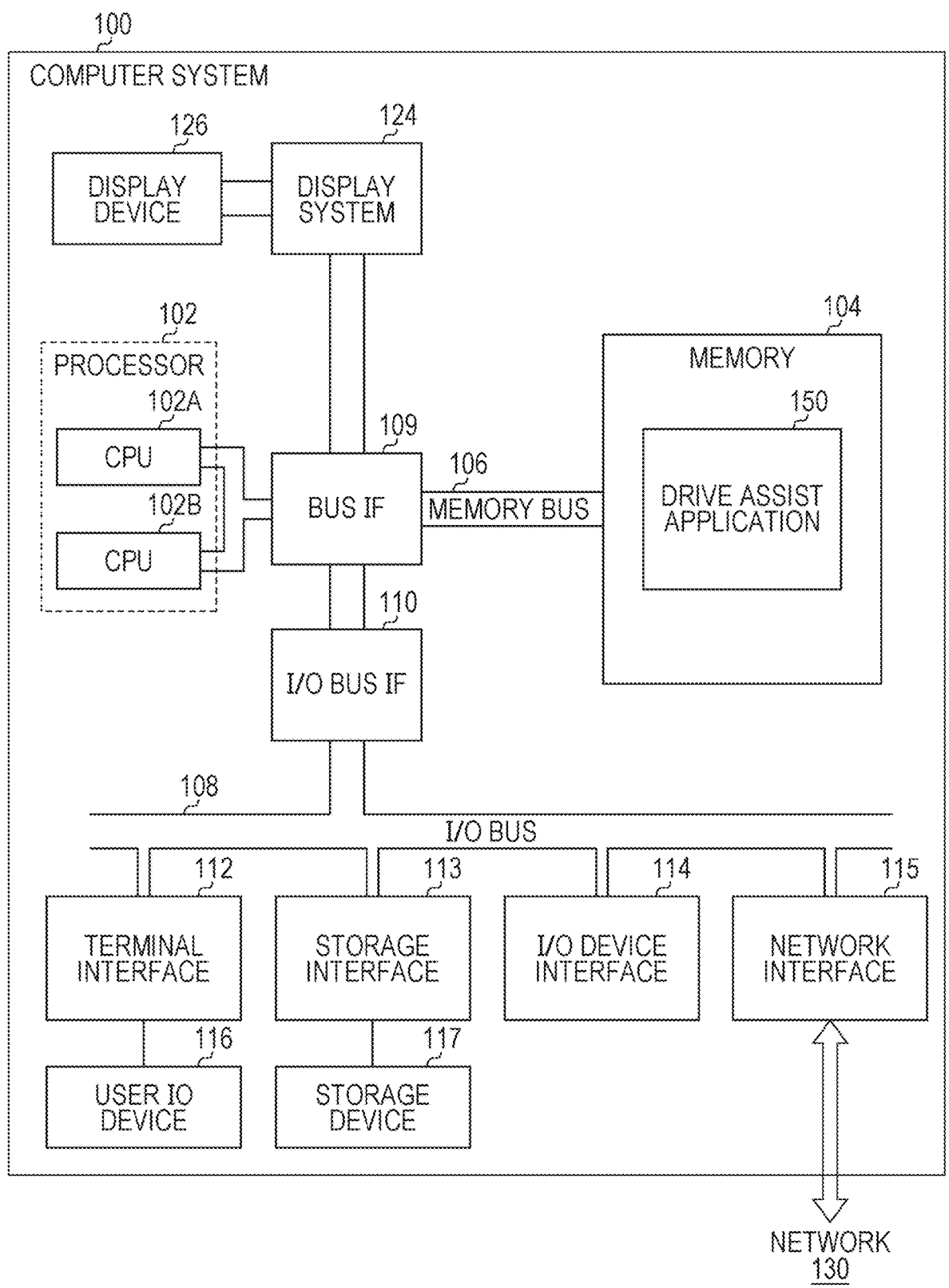
FIG. 1 is a diagram illustrating a computer system for implementing an embodiment of the present disclosure.

First, a computer system 100 for implementing the embodiment of the present disclosure will be described with reference to FIG. 1. Mechanisms and devices of various embodiments disclosed in the present specification may be applied to any appropriate computing system. Main components of the computer system 100 include one or more processors 102, a memory 104, a terminal interface 112, a storage interface 113, an input and output (I/O) device interface 114, and a network interface 115. These components may be connected to each other via a memory bus 106, an I/O bus 108, a bus interface unit 109, and an I/O bus interface unit 110.

The computer system 100 may include one or more general purpose programmable central processing units (CPUs) 102A and 102B collectively referred to as the processor 102. In one embodiment, the computer system 100 may include a plurality of processors, and in another embodiment, the computer system 100 may be a single CPU system. Each processor 102 may execute a command stored in the memory 104 and include an onboard cache.

In one embodiment, the memory 104 may include a random access semiconductor memory, a storage device, or a storage medium (either a volatile storage medium or a non-volatile storage medium) for storing data and programs. The memory 104 may store all or part of programs, modules, and data structures that implement the functions described in the present specification. For example, the memory 104 may store a drive assist application 150. In one embodiment, the drive assist application 150 may include commands or descriptions that execute the functions to be described below on the processor 102.

In one embodiment, the drive assist application 150 may be implemented in hardware via a semiconductor device, a chip, a logic gate, a circuit, a circuit card, and/or another physical hardware device in place of a processor-based system or in addition to a processor-based system. In one embodiment, the drive assist application 150 may include data other than commands or descriptions. In one embodiment, a camera, a sensor, or another data input device (not illustrated) may be provided to communicate directly with the bus interface unit 109, the processor 102, or another hardware of the computer system 100.

The computer system 100 may include a bus interface unit 109 that communicates between the processor 102, the memory 104, a display system 124, and the I/O bus interface unit 110. The I/O bus interface unit 110 may be coupled to the I/O bus 108 for transferring data to and from various I/O units. The I/O bus interface unit 110 may communicate with a plurality of I/O interfaces 112, 113, 114, and 115 also known as I/O processors (IOPs) or I/O adapters (IOAs) via the I/O bus 108.

The display system 124 may include a display controller or a display memory, or both the display controller and the display memory. The display controller can provide a video or an audio, or data of both the video and the audio to a display device 126. Further, the computer system 100 may also include devices such as one or a plurality of sensors configured to collect data and provide the data to the processor 102.

For example, the computer system 100 includes a biometric sensor that collects heart rate data, stress level data, and the like, an environment sensor that collects humidity data, temperature data, pressure data, and the like, and a motion sensor that collects acceleration data, exercise data, and the like. Other types of sensors can also be used. The display system 124 may be connected to the display device 126 such as a single display screen, a television, a tablet, or a portable device.

The I/O interface has a function of communicating with various storages or I/O devices. For example, a user I/O device 116 such as a user output device such as a video display device or a speaker TV, or a user input device such as a keyboard, a mouse, a keypad, a touchpad, a trackball, a button, a light pen, or another pointing device can be attached to the terminal interface 112. The user may input data and instructions to the user I/O device 116 and the computer system 100 by operating the user input device by using the user interface, and may receive output data from the computer system 100. For example, the user interface may be displayed on the display device via the user I/O device 116, may be played back by a speaker, or may be printed through a printer.

One or a plurality of disk drives or a direct access storage device 117 (usually, may be a magnetic disk drive storage device, but may be an array of disk drives or another storage device configured to be seen as a single disk drive) may be attached to the storage interface 113. In one embodiment, the storage device 117 may be mounted as any secondary storage device. Contents of the memory 104 may be stored in the storage device 117 and may be read out from the storage device 117 as needed. An interface to other I/O devices such as a printer, a fax machine, and the like may be provided as the I/O device interface 114. The network interface 115 may provide a communication path such that the computer system 100 and other devices can communicate with each other. This communication path may be, for example, a network 130.

In one embodiment, the computer system 100 may be a device that receives a request from another computer system (client) that does not have a direct user interface, such as a multi-user mainframe computer system, a single user system, or a server computer. In another embodiment, the computer system 100 may be a desktop computer, a portable computer, a laptop computer, a tablet computer, a pocket computer, a telephone, a smartphone, or any other appropriate electronic device.

Next, a configuration of a drive assist system according to the embodiment of the present disclosure will be described with reference to FIG. 2.

Figure 2:
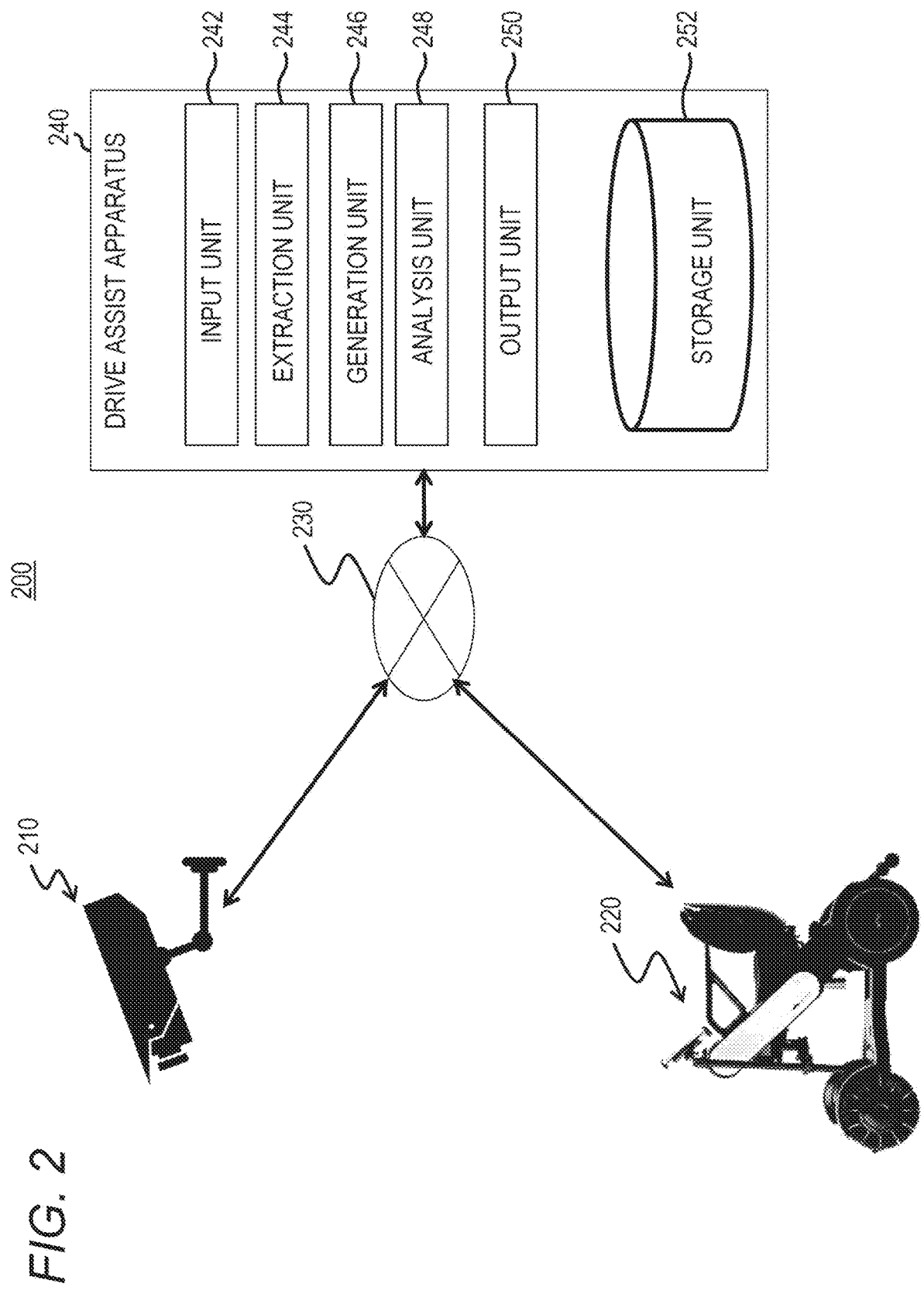
FIG. 2 is a diagram illustrating an example of a configuration of a drive assist system according to the embodiment of the present disclosure.

FIG. 2 is a diagram illustrating an example of a configuration of a drive assist system 200 according to the embodiment of the present disclosure. As illustrated in FIG. 2, the drive assist system 200 according to the embodiment of the present disclosure includes a sensor group 210, a mobile object 220, a communication network 230, and a drive assist apparatus 240. Further, the sensor group 210, the mobile object 220, and the drive assist apparatus 240 are connected to each other via the communication network 230.

The communication network 230 here may include, for example, the Internet, a local area network (LAN), a metropolitan area network (MAN), a wide area network (WAN), and the like.

The sensor group 210 is a sensor device installed in a moving region in which the mobile object 220 moves and configured to acquire sensor data regarding the mobile object 220 and the moving region. The sensor group 210 may include, for example, a camera that acquires images of the mobile object and the moving region, or a three-dimensional scan type distance sensor that acquires information such as dimensions (height, width, and depth), a shape, and a position of an object present in the moving region.

The number, kind, and arrangement of the sensor group 210 may be appropriately selected depending on a width and a layout of the moving region, but it is desirable that the sensor group is configured to be able to capture the entire moving region. The moving region mentioned here is an environment in which the mobile object 220 moves, and may be a public facility such as an airport, a station, a hospital, or an office building, and may be any environment as long as the sensor group 210 can be installed.

The sensor group 210 may transfer the sensor data acquired for the mobile object 220 and the moving region as it is to the drive assist apparatus 240, and may be transferred to the drive assist apparatus 240 after the totalizing, preprocessing, or object detection of the sensor data is performed by using a local computing device that can be used for the sensor group 210.

In one embodiment, the sensor group 210 may acquire, as the sensor data, first height information indicating a first height which is a height of the mobile object and second height information indicating a second height which is a height of an object present within a predetermined distance from the mobile object, and may be transmitted to the drive assist apparatus 240. Further, in one embodiment, the sensor group 210 may acquire, as the sensor data, an input image indicating the moving region or the mobile object 220, and may transmit the input image to the drive assist apparatus 240.

The mobile object 220 is a vehicle that moves within the moving region. The mobile object 220 may be, for example, any mobile object such as an electric wheelchair, a scooter, or an automobile, and is not particularly limited in the present disclosure as long as the mobile object can carry a passenger and move within the moving region. The mobile object 220 may include a terminal (tablet computer or the like) for displaying information such as a map to a passenger and receiving instructions from the passenger. Further, the mobile object 220 may have a communication function for performing data communication with the drive assist apparatus 240 via the communication network 230.

In one embodiment, the mobile object 220 includes an automatic driving function and can automatically determine a route to a destination within the moving region. As an example, when the mobile object 220 enters a moving environment, the mobile object transmits a service request to the drive assist apparatus 240, and then receives, as guidance information for moving within the mobile environment, a two-dimensional map (combined map) showing objects such as obstacles, risks, and the like present in the mobile environment from the drive assist apparatus 240. Thereafter, the mobile object 220 may automatically determine a safe route to a destination within the moving region based on the received combined map.

The drive assist apparatus 240 is an apparatus for assisting the driving of the mobile object 220 moving in the moving region. The drive assist apparatus 240 can generate, as guidance information for assisting the driving of the mobile object 220, the combined map showing the objects such as obstacles and risks present in the moving environment based on, for example, the sensor data received from the sensor group 210, and can transmit the generated combined map to the mobile object 220. In one embodiment, the drive assist apparatus 240 may be a remote server device geographically separated from the mobile object 220 and the moving region.

As illustrated in FIG. 2, the drive assist apparatus 240 may include an input unit 242, an extraction unit 244, a generation unit 246, an analysis unit 248, an output unit 250, and a storage unit 252.

The input unit 242 is a functional unit for receiving the sensor data from the sensor group 210 and the request from the mobile object 220. For example, the input unit 242 may receive, as the sensor data, the first height information indicating the first height which is the height of the mobile object 220 and the second height information indicating the second height which is the height of the object present in within the predetermined distance from the mobile object 220 from the sensor group 210 installed in the moving region. Further, in one embodiment, the input unit 242 may receive, as the sensor data, the input image indicating the moving region or the mobile object 220.

The extraction unit 244 is a functional unit for extracting plan views from a three-dimensional model of the moving region stored in the storage unit 252 to be described later based on the sensor data received from the sensor group 210. For example, the extraction unit 244 may extract a first plan view from the three-dimensional model based on the first height information, and may extract a second plan view from the three-dimensional model based on the second height information.

The generation unit 246 is a functional unit for generating the combined map as the guidance information for assisting the driving of the mobile object 220 within the moving environment based on the plan views extracted by the extraction unit 244. For example, the generation unit 246 may generate the combined map for two-dimensionally showing the moving region and assisting the driving of the mobile object 220 by combining the first plan view and the second plan view.

The analysis unit 248 is a functional unit for analyzing the sensor data received from the sensor group 210. For example, the analysis unit 248 may determine a risk factor having a possibility of obstructing the movement of the mobile object 220 by analyzing the input image indicating the moving region or the mobile object 220 received from the sensor group 210 and the combined map generated by the generation unit 246.

The output unit 250 is a functional unit for outputting various kinds of information from the drive assist apparatus. For example, the output unit 250 may transmit the combined map generated by the generation unit 246 to the mobile object 220.

The storage unit 252 is a storage unit that stores at least a three-dimensional model that three-dimensionally shows the moving region. The storage unit 252 may be a local storage device such as a hard disk drive or a solid state drive mounted on the drive assist apparatus 240, or may be a cloud-type storage region accessible from the drive assist apparatus 240.

The three-dimensional model mentioned here may be, for example, a CG model, and is generated in advance based on a floor plan, an image, or the like of a moving region, and is stored in the storage unit 252. Any existing means may be used as means for generating the three-dimensional model, and the present disclosure is not particularly limited.

According to the drive assist system 200 having the above-described configuration, it is possible to provide drive assist means that can also be used for a mobile object not including a sensor and that assists the driving of the mobile object while suppressing a processing load on the mobile object side.

Next, a flow of a drive assist method by the drive assist system according to the embodiment of the present disclosure will be described with reference to FIG. 3.

Figure 3:
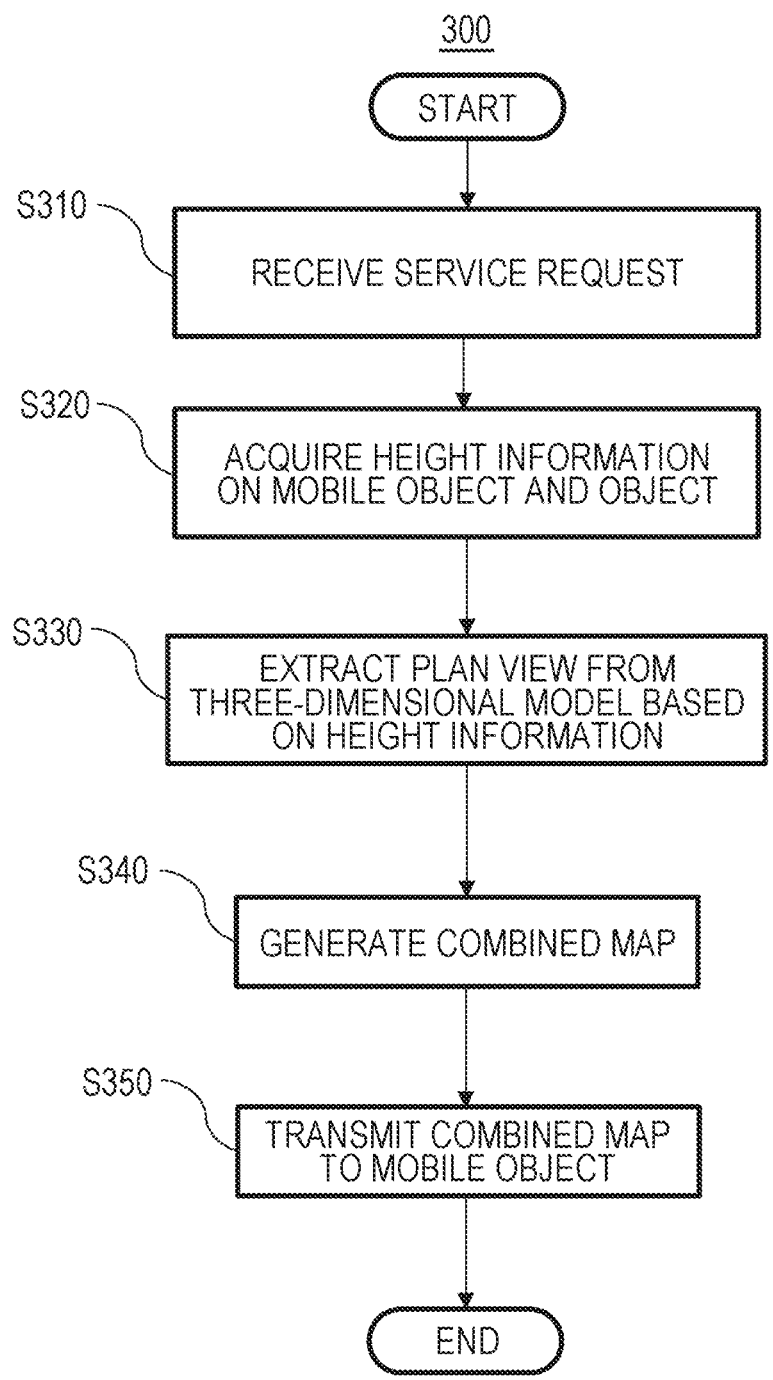
FIG. 3 is a diagram illustrating an example of a flow of a drive assist method by the drive assist system according to the embodiment of the present disclosure.

FIG. 3 is a diagram illustrating an example of a flow of a drive assist method 300 by the drive assist system according to the embodiment of the present disclosure. The drive assist method 300 illustrated in FIG. 3 is processing for generating the combined map as the guidance information for assisting driving within the moving environment of the mobile object, and is implemented by, for example, the functional units of the drive assist apparatus 240 illustrated in FIG. 2.

First, in step S310, the input unit (for example, the input unit 242 illustrated in FIG. 2) receives a service request for requesting a drive assist service by the drive assist system from the mobile object (for example, the mobile object 220 illustrated in FIG. 2). This service request may be transmitted to the drive assist apparatus based on the instruction of the passenger of the mobile object, or may be automatically transmitted to the assist apparatus when the mobile object enters the moving region and is connected to the communication network.

In one embodiment, the service request may include information such as information on the mobile object (for example, dimensions, a weight, and a maximum speed), information on the destination of the mobile object, and information on an intention of the passenger (an intention to avoid a congested route, or an intention to follow a route where an outside scenery can be seen) in addition to the instruction to request the drive assist service.

The drive assist apparatus that receives the service request may transmit a sensor data acquisition instruction to the sensor group installed in the moving region. Thereafter, the sensor group that receives this sensor data acquisition instruction starts acquiring the sensor data.

Subsequently, in step S320, the input unit receives the sensor data from the sensor group (for example, the sensor group 210 illustrated in FIG. 2). For example, the input unit may receive, as the sensor data, the first height information indicating the first height which is the height of the mobile object and the second height information indicating the second height which is the height of the object that satisfies a predetermined distance criterion from the mobile object from the sensor group installed in the moving region.

The first height and the second height mentioned here are measured by the sensor group. For example, in one embodiment, the sensor group may measure the first height and the second height by three-dimensional scanning means such as LIDAR. Further, in one embodiment, the sensor group may acquire the input image indicating the moving region or the mobile object, and may acquire the first height and the second height by applying predetermined image processing means on the input image.

Note that, the expression "height of the mobile object" may be the height of the mobile object itself, or may be a total height including the passenger seated on the mobile object.

Here, although the case where two heights, that is, the first height which is the height of the mobile object and the second height which is the height of the object present within the predetermined distance from the mobile object are acquired will be described as an example, the present disclosure is not limited thereto, and values of heights of any number of objects may be acquired. For example, in one embodiment, the sensor group may acquire a height of a luggage carried by the passenger (third height) and a height of another object (fourth height) in addition to the first height and the second height, and may transmit the acquired heights to the drive assist apparatus.

Further, the predetermined distance criterion for the mobile object mentioned here is a preset distance range, and may be set as any distance such as 3 meters or 5 meters.

A range of a target in which the object is detected becomes narrower by setting the distance criterion as a smaller value, but computing resources required to generate the combined map can be reduced.

On the other hand, the range of the target in which the object is detected becomes wider by setting the distance criterion as a larger value, but the computing resources required to generate the combined map are increased.

Accordingly, this distance criterion may be appropriately set according to the floor plan and the size of the moving region, a moving speed of the mobile object, the amount of computing resources available in the drive assist system, and the like.

In one embodiment, for example, when the computing resources are not particularly limited, the distance criterion mentioned here may be set as a value that includes the entire moving region. As a result, all the objects and the risks present in the moving region can be comprehensively detected, and a wider range of combined map can be generated.

Subsequently, in step S330, the extraction unit (for example, the extraction unit 244 illustrated in FIG. 2) extracts the first plan view from the three-dimensional model based on the first height information, and extracts the second plan view from the three-dimensional model based on the second height information.

More specifically, the extraction unit extracts, as the first plan view, a first plane orthogonal to a height direction of the mobile object (direction orthogonal to a traveling surface) and corresponding to the first height from the three-dimensional model, and extracts, as the second plan view, a second plane orthogonal to the height direction of the mobile object and corresponding to the second height from the three-dimensional model.

In other words, the extraction unit cuts the three-dimensional model by a plurality of planes orthogonal to the height direction of the mobile object, and extracts plan views showing cross-sectional shapes of the object in the planes corresponding to the first height and the second height.

As a result, the first plan view showing the cross-sectional shape of the object present in the first plane within the moving region and the second plan view showing the cross-sectional shape of the object present in the second plane within the moving region can be obtained.

Subsequently, in step S340, the generation unit (for example, the generation unit 246 illustrated in FIG. 2) generates the combined map for two-dimensionally showing the moving region and assisting the driving of the mobile object by combining the first plan view and the second plan view extracted in step S330.

More specifically, the generation unit generates, as the combined map, a two-dimensional map showing the cross-sectional shape of the object present in the first plane within the moving region and the cross-sectional shape of the object present in the second plane within the moving region by superimposing the first plan view and the second plan view based on the first height and the second height.

In this manner, a two-dimensional map in which maps showing the cross-sectional shapes of the object on the plurality of planes orthogonal to the height direction of the mobile object are superimposed can be obtained as the combined map.

Subsequently, in step S350, the output unit transmits the combined map generated by the generation unit in step S340 to the mobile object via the communication network. Thereafter, the mobile object that receives the combined map may determine a safe route to the destination within the moving region based on the combined map.

Note that, here, existing automatic driving means can be used as means for determining the safe route to the destination within the moving region based on the combined map, and is not particularly limited here.

According to the drive assist method 300 described above, it is possible to provide drive assist means that can also be used for a mobile object not including a sensor and that assists the driving of the mobile object while suppressing a processing load on the mobile object side.

Next, a flow of data in the drive assist system according to the embodiment of the present disclosure will be described with reference to FIG. 4.

Figure 4:
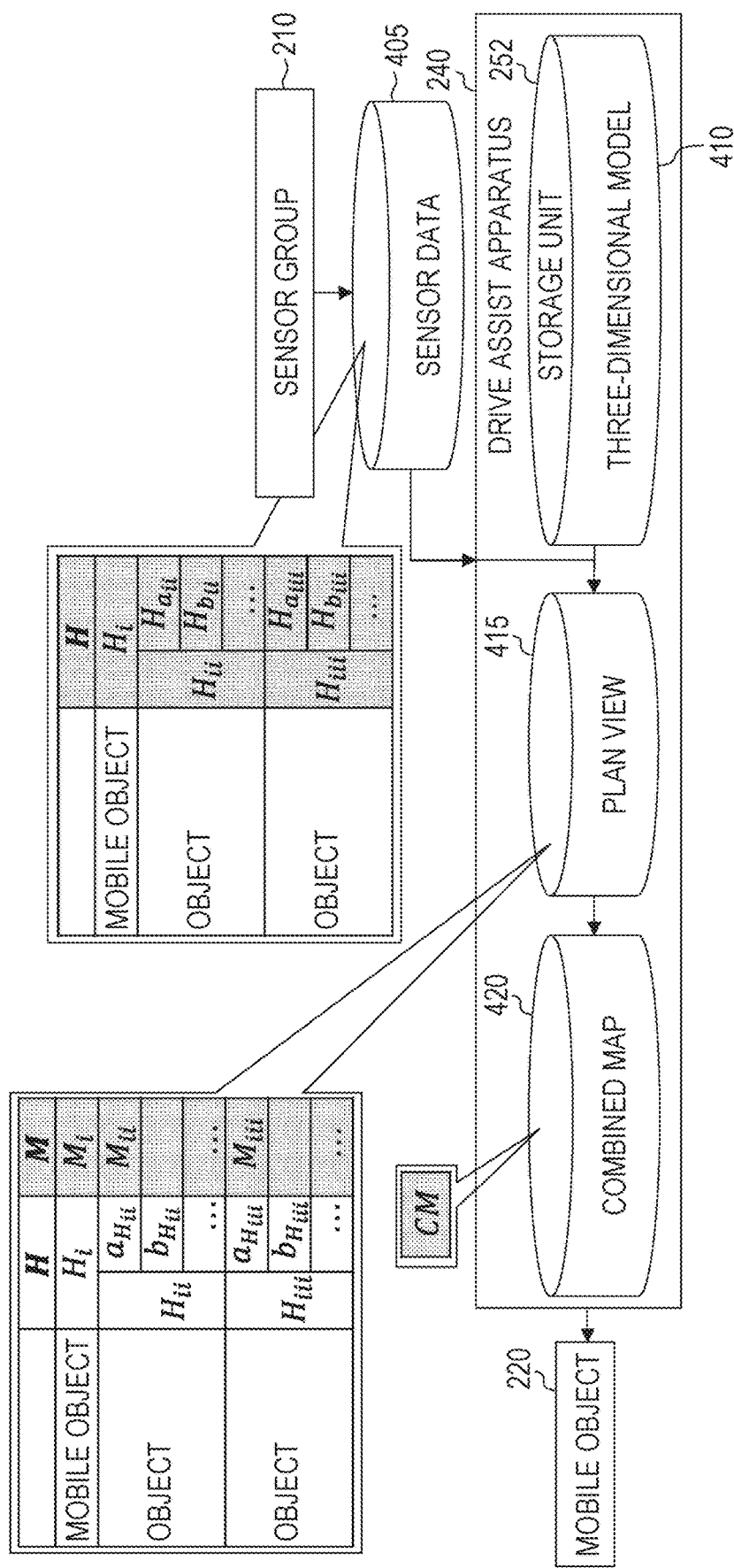
FIG. 4 is a diagram illustrating an example of a flow of data in the drive assist system according to the embodiment of the present disclosure.

FIG. 4 is a diagram illustrating an example of the flow of the data in the drive assist system according to the embodiment of the present disclosure.

First, as described above, the sensor group 210 acquires sensor data 405 and transfers the sensor data to the drive assist apparatus 240. As illustrated in FIG. 4, the sensor data 405 includes a first height $H_i$ which is the height of the mobile object 220, a second height $H_{ii}$ which is the height of the object that satisfies a predetermined distance criterion from the mobile object 220, and a third height $H_{iii}$ which is the height of the luggage carried by the passenger of the mobile object 220.

In one embodiment, the sensor group 210 may acquire heights $H_{aii}$ and $H_{bii}$ of the object and heights $H_{aiii}$ and $H_{biii}$ of the luggage measured at different times a and b, and may use average values of the heights measured at different times as the second height $H_{ii}$ and the third height $H_{iii}$. As a result, it possible to grasp changes in the height due to, for example, movement of the passenger or the object (movement of a sitting person standing up).

In one embodiment, the sensor data 405 may be formed as a one-dimensional matrix.

After the sensor data 405 is received, the drive assist apparatus 240 (more specifically, the extraction unit 244 included in the drive assist apparatus 240) extracts, as a plan view 415, the plane corresponding to the height and orthogonal to the height direction of the mobile object 220 from the three-dimensional model 410 stored in the storage unit 252 for each of the first height $H_i$, the second height $H_{ii}$, and the third height $H_{iii}$ included in the sensor data 405.

For example, as illustrated in FIG. 4, the drive assist apparatus 240 may extract a first plan view $M_i$ corresponding to the first height $H_i$, a second plan view $M_{ii}$ corresponding to the second height $H_{ii}$, and a third plan view $M_{iii}$ corresponding to the third height $H_{iii}$ from the three-dimensional model 410. Further, the extraction of the plan views may be performed at different times a and b.

After the plan views 415 corresponding to the heights $H_i$, $H_{ii}$, and $H_{iii}$ are extracted, the drive assist apparatus 240 generates a combined map 420 for two-dimensionally showing the moving region and assisting the driving of the mobile object, and transmits the generated combined map to the mobile object 220 by combining the first plan view $M_i$, the second plan view $M_{ii}$, and the third plan view $M_{iii}$.

Next, a usage example of the drive assist system according to the embodiment of the present disclosure will be described with reference to FIG. 5.

Figure 5:
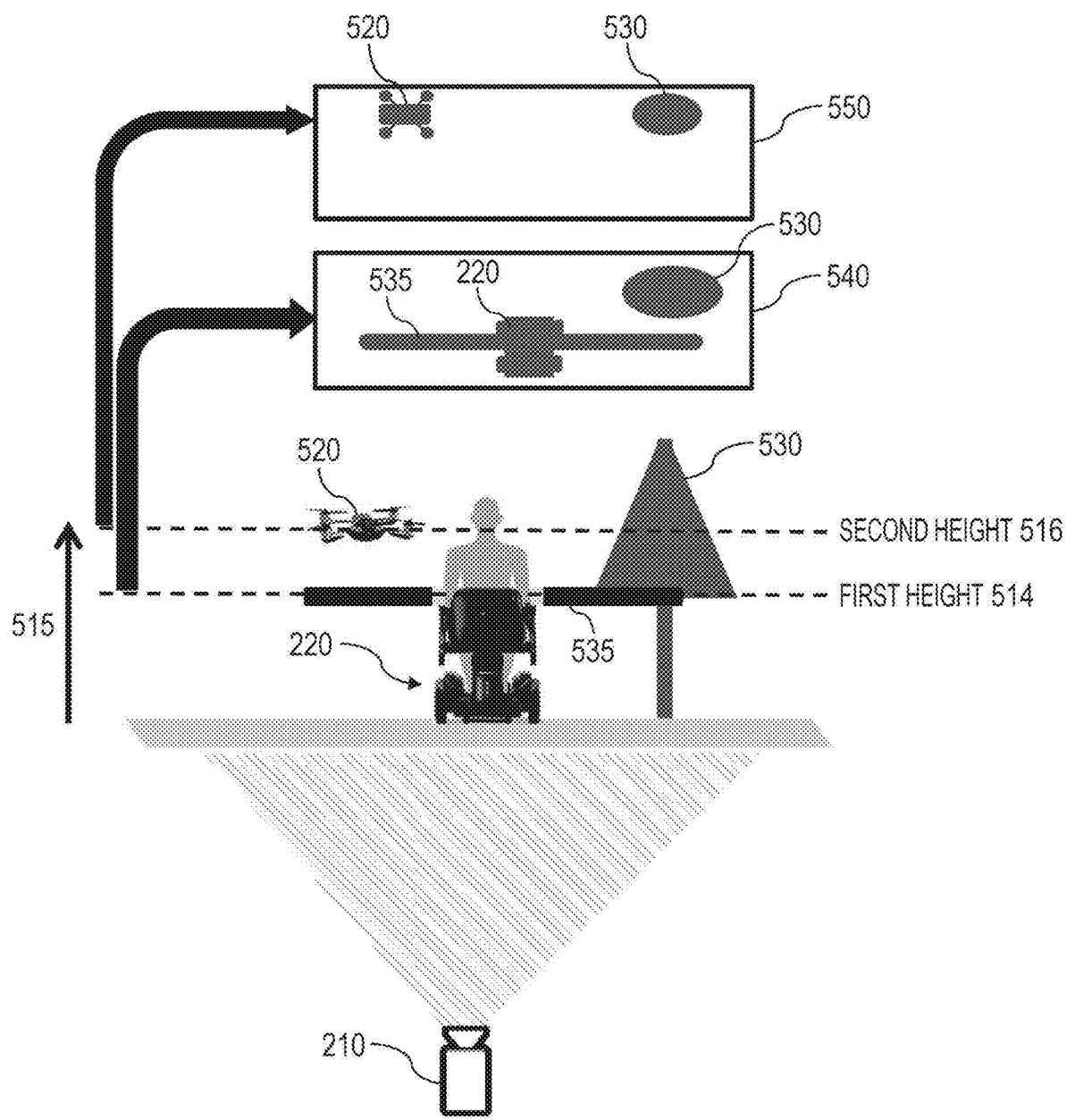
FIG. 5 is a diagram illustrating a usage example of the drive assist system according to the embodiment of the present disclosure.

FIG. 5 is a diagram illustrating the usage example of the drive assist system according to the embodiment of the present disclosure.

It is assumed that the mobile object 220 illustrated in FIG. 5 enters a predetermined moving region. At this time, the service request that requests the drive assist service is transmitted from the mobile object 220 to the drive assist apparatus (not illustrated in FIG. 5) via the communication network in the moving region. Thereafter, the drive assist apparatus that receives the service request transmits the sensor data acquisition instruction to the sensor group 210 installed within the moving region. The sensor group 210 that receives this sensor data acquisition instruction starts acquiring the sensor data.

Here, the sensor group 210 acquires, as the sensor data, first height information indicating a first height 514 which is the height of the mobile object 220 and second height information indicating a second height 516 which is a height of an object 520 that satisfies a predetermined distance criterion from the mobile object 220, and transmits the acquired sensor data to the drive assist apparatus.

The drive assist apparatus that receives the sensor data extracts, as a first plan view 540, a first plane orthogonal to a height direction 515 of the mobile object 220 and corresponding to the first height 514 from the three-dimensional model, and extracts, as a second plan view 550, a second plane orthogonal to the height direction 515 of the mobile object 220 and corresponding to the second height 516 from the three-dimensional model.

As a result, the first plan view 540 showing cross-sectional shapes of the mobile object 220, a luggage 535, and an object 530 present on the first plane orthogonal to the height direction 515 of the mobile object 220 and corresponding to the first height 514 and the second plan view 550 showing the cross-sectional shapes of the object 520 and the object 530 present on the second plane orthogonal to the height direction 515 of the mobile object 220 and corresponding to the second height 516 can be obtained.

Thereafter, the drive assist apparatus generates the combined map (not illustrated in FIG. 5) for two-dimensionally showing the moving region and assisting the driving of the mobile object 220 by combining the first plan view 540 and the second plan view 550, and transmits the generated combined map to the mobile object 220.

It is possible to determine the risk factor having a possibility of obstructing the movement of the mobile object 220 by analyzing the combined map generated here. In one embodiment, a fact that there is a possibility that the luggage 535 carried by the passenger of the mobile object 220 collides with the object 530 may be determined as the risk factor by analyzing the combined map generated here by using the analysis unit described above (for example, the analysis unit 248 illustrated in FIG. 2). Information on the risk factor determined by the analysis unit may be added to the combined map. As a result, the mobile object 220 that receives the combined map including the information on the risk factor can determine a safe route to avoid the risk factor.

Note that, the details of the processing of determining the risk factor by using the analysis unit of the drive assist apparatus will be described later.

Next, the three-dimensional model according to the embodiment of the present disclosure will be described with reference to FIG. 6.

Figure 6:
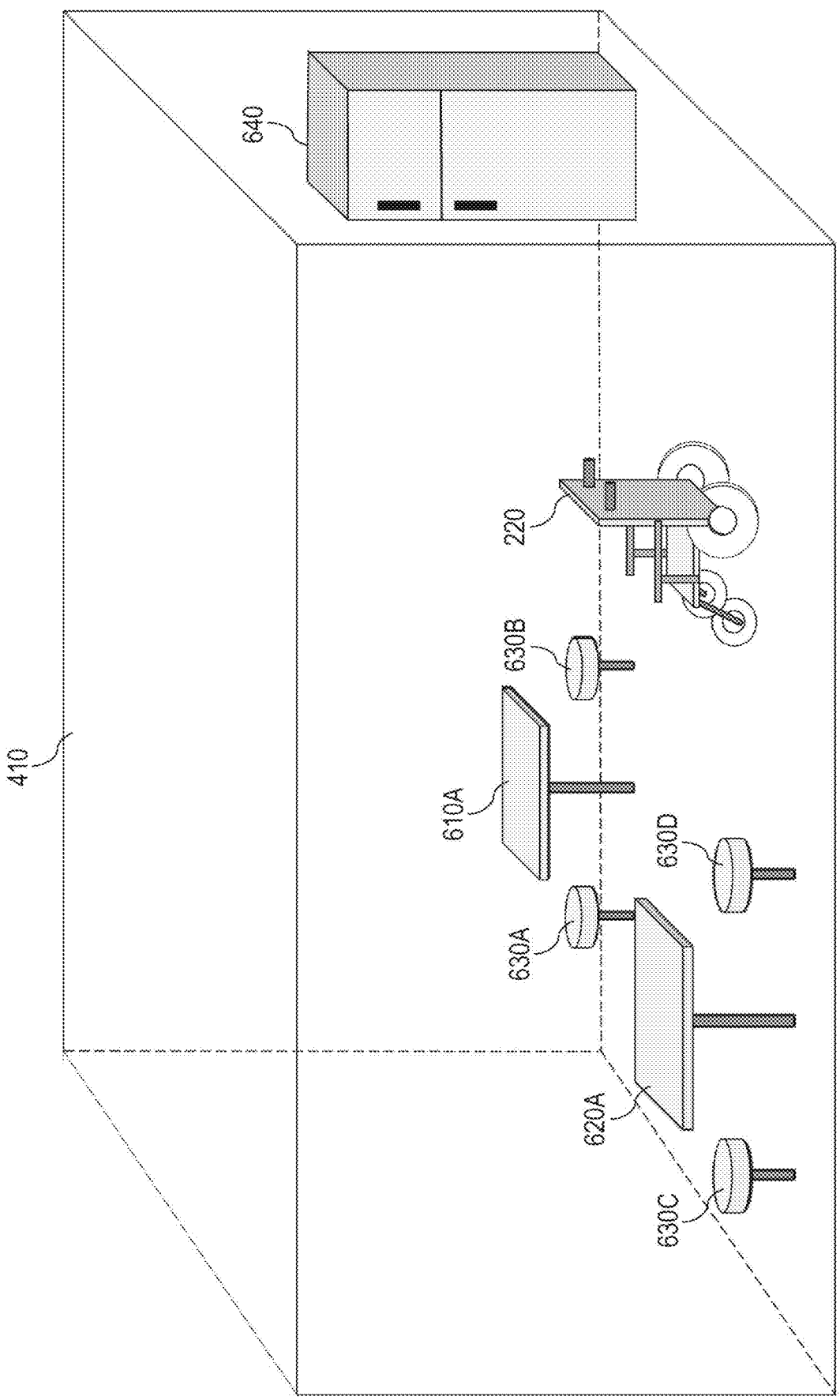
FIG. 6 is a diagram illustrating an example of a three-dimensional model according to the embodiment of the present disclosure.

FIG. 6 is a diagram illustrating an example of the three-dimensional model 410 according to the embodiment of the present disclosure. As described above, the three-dimensional model 410 according to the embodiment of the present disclosure is a three-dimensional model that three-dimensionally shows the moving region at an accurate scale ratio, and may be, for example, a CG model. The three-dimensional model 410 may show all the objects such as mobile objects, furniture, home appliances, walls, people, animals, and the like present in the moving region. For example, as illustrated in FIG. 6, the three-dimensional model 410 may show the mobile object 220, tables 610A and 620B, chairs 630A, 630B, 630C, and 630D, and a refrigerator 640.

The three-dimensional model 410 according to the embodiment of the present disclosure is generated in advance based on the floor plan of the moving region, the image acquired by the sensor group, and the like, and is stored in the storage unit. Any existing means may be used as means for generating the three-dimensional model, and the present disclosure is not particularly limited.

It is possible to extract the plane orthogonal to the height direction of the mobile object 220 as the plan view at any height by creating the three-dimensional model 410 illustrated in FIG. 6 in advance and storing the three-dimensional model in the storage unit.

Next, a specific example of the processing of generating the combined map according to the embodiment of the present disclosure will be described with reference to FIGS. 7 to 9.

Figure 7:
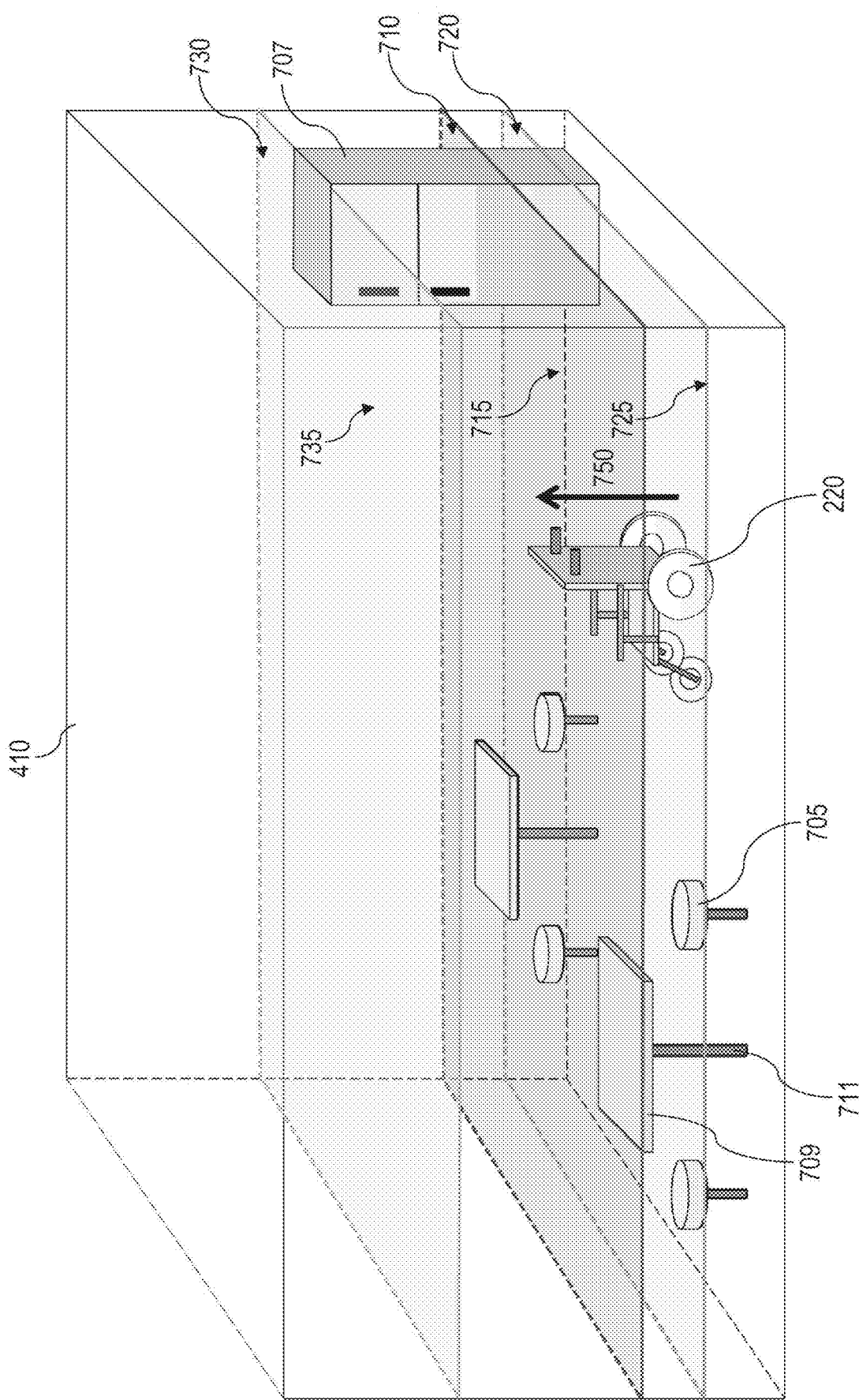
FIG. 7 is a diagram illustrating a specific example of processing of extracting plan views from the three-dimensional model according to the embodiment of the present disclosure.

FIG. 7 is a diagram illustrating a specific example of the processing of extracting the plan views from the three-dimensional model 410 according to the embodiment of the present disclosure.

As described above, the extraction unit is configured to cut the three-dimensional model 410 by the plurality of planes orthogonal to a height direction 750 of the mobile object and extract the plan views showing the cross-sectional shapes of the object in the planes corresponding to the heights included in the sensor data acquired by the sensor group.

As an example, it is assumed that the drive assist apparatus receives sensor data including a first height 710 which is the height of the mobile object 220, a second height 720 which is a height of the chair 705, and a third height 730 which is a height of the refrigerator 707 from the sensor group.

In this case, the extraction unit extracts, as a first plan view 810 (see FIG. 8), a first plane 715 orthogonal to the height direction 750 of the mobile object 220 and corresponding to the first height 710 from the three-dimensional model 410. Further, the extraction unit extracts, as a second plan view 820 (see FIG. 8), a second plane 725 orthogonal to the height direction 750 of the mobile object 220 and corresponding to the second height 720 from the three-dimensional model 410. Further, the extraction unit extracts, as a third plan view 830 (see FIG. 8), a third plane 735 orthogonal to the height direction 750 of the mobile object 220 and corresponding to the third height 730 from the three-dimensional model 410.

Figure 8:
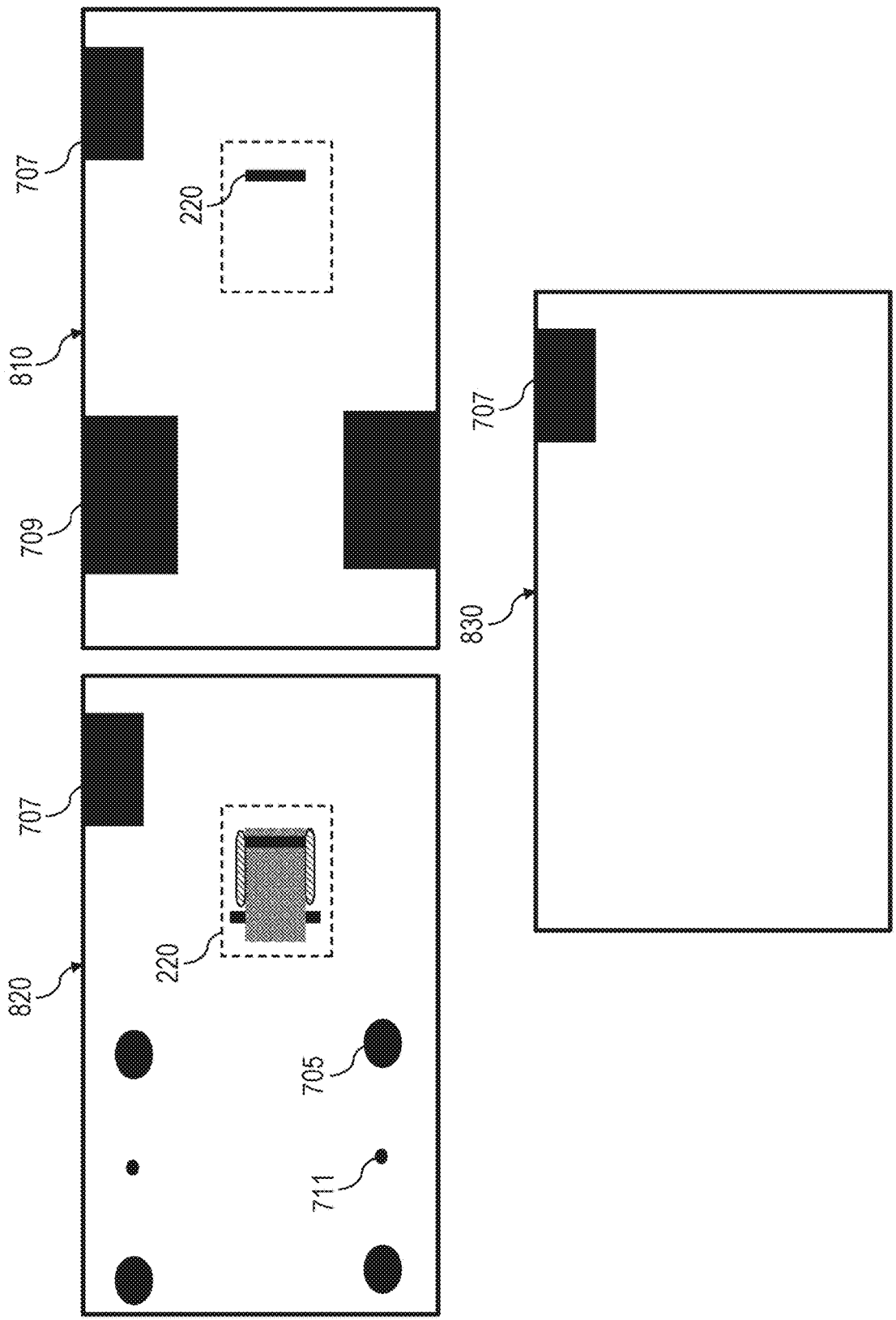
FIG. 8 is a diagram illustrating a specific example of the plan view extracted from the three-dimensional model according to the embodiment of the present disclosure.

FIG. 8 is a diagram illustrating specific examples of the plan views 810, 820, and 830 extracted from the three-dimensional model 410 illustrated in FIG. 7.

As illustrated in FIG. 8, the second plan view 820 shows the cross-sectional shapes of the four chairs 705, two legs 711 of the table, mobile object 220, and the refrigerator 707 present in the second plane 725 orthogonal to the height direction 750 of the mobile object 220 and corresponding to the second height 720.

Further, the first plan view 810 shows the cross-sectional shapes of a top plate 709 of the table, a backrest of the mobile object 220, and the refrigerator 707 present in the first plane 715 orthogonal to the height direction 750 of the mobile object 220 and corresponding to the first height 710.

Further, the third plan view 830 shows the cross-sectional shape of the refrigerator 707 present in the third plane 735 orthogonal to the height direction 750 of the mobile object 220 and corresponding to the third height 730.

In this manner, it is possible to obtain the plan view showing the cross-sectional shape of the object present in the plane orthogonal to the height direction 750 of the mobile object 220 within the moving region and corresponding to any height.

Figure 9:
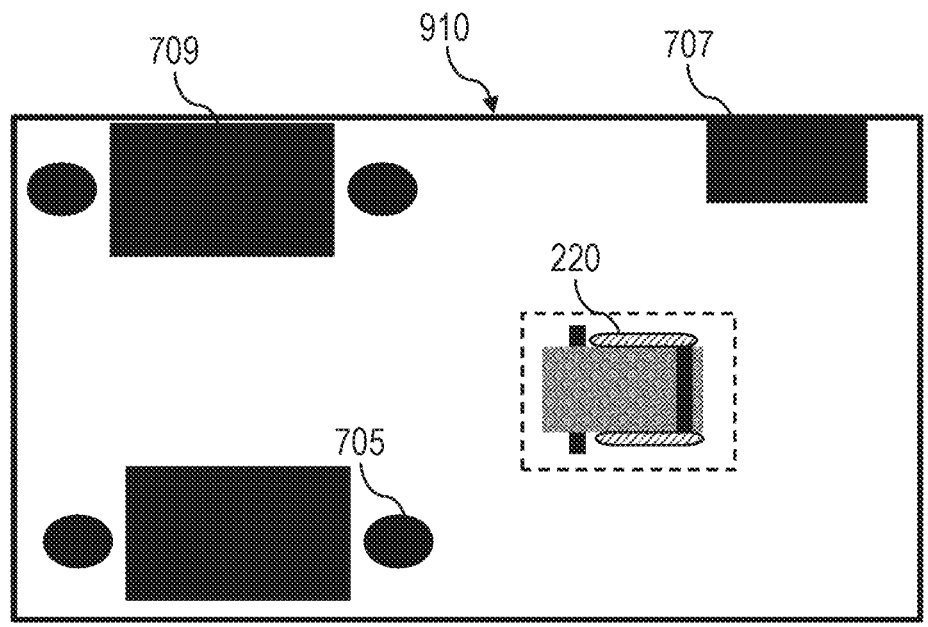
FIG. 9 is a diagram illustrating a specific example of a combined map obtained by combining the plan views according to the embodiment of the present disclosure.

FIG. 9 is a diagram illustrating a specific example of the combined map obtained by combining the plan views illustrated in FIG. 8. As described above, the generation unit of the drive assist apparatus according to the embodiment of the present disclosure generates a combined map 910 for two-dimensionally showing the moving region and assisting the driving of the mobile object by combining the plan views extracted from the three-dimensional model.

More specifically, the generation unit may generate, as the combined map, the two-dimensional map showing the cross-sectional shapes of the objects present in the first plane 715, the second plane 725, and the third plane 735 within the moving region by superimposing the first plan view 810, the second plan view 820, and the third plan view 830.

Here, the generation unit may determine a superimposition order of the first plan view 810, the second plan view 820, and the third plan view 830 based on the first height 710, the second height 720, and the third height 730. For example, the generation unit may superimpose the plan views in the order of height, such as a case where the plan view corresponding to the lower height is on a lower side and the plan view corresponding to the higher height is on an upper side.

In one embodiment, as illustrated in FIG. 9, the generation unit may generate the combined map 910 that opaquely shows the cross-sectional shapes of the objects shown in the first plan view 810, the second plan view 820, and the third plan view 830. As a result, when the plurality of cross-sectional shapes overlap, the combined map 910 on which the lower cross-sectional shape (for example, the legs 711 of the table) is hidden and only the cross-sectional shape having the highest height (for example, the top plate 709 of the table) is shown is obtained as in the case where the moving region is viewed directly above.

On the other hand, in one embodiment, the generation unit may generate the combined map 910 that shows the cross-sectional shapes of the objects shown in the first plan view 810, the second plan view 820, and the third plan view 830 in different translucent colors. As an example, the generation unit may show the cross-sectional shape of the object shown in the first plan view 810 in translucent red, may show the second plan view 820 in translucent blue, and may show the third plan view 830 in translucent green. As a result, the combined map 910 showing the shapes of the objects present in the planes in one figure is obtained.

In this manner, the two-dimensional map in which the plan views showing the cross-sectional shapes of the objects in the plurality of planes orthogonal to the height direction of the mobile object are superimposed can be obtained as the combined map 910. Thereafter, the mobile object can automatically determine the safe route to the destination within the moving region based on this combined map 910.

Further, in one embodiment, the generation unit may generate a wider map by synthesizing the combined maps produced for different portions of the moving region.

Next, the risk factor determination by the drive assist system according to the embodiment of the present disclosure will be described with reference to FIGS. 10 to 11.

As described above, the analysis unit (for example, the analysis unit 248 illustrated in FIG. 2) according to the embodiment of the present disclosure can determine the risk factor having a possibility of obstructing the movement of the mobile object by analyzing the input image received from the sensor group and the combined map generated by the generation unit.

The risk factor mentioned here means that there is a possibility that the movement of the mobile object is obstructed, and may include, for example, a human behavior, an obstacle, a dangerous situation, and the like.

In one embodiment, when the input image indicating the moving region or the mobile object is received from the sensor group, the analysis unit may detect the obstacle or the dangerous situation having a possibility of colliding with the mobile object by analyzing the input image by existing image processing means.

Here, for example, the analysis unit may use, as the image processing means for determining the risk factor, any method such as a machine learning approach such as Viola-Jones object detection framework based on Haar-Like features, scale-invariant feature value transform (SIFT), and Hog feature values, and an approach by deep learning such as domain proposal (R-CNN, Fast R-CNN, Faster R-CNN, or cascade R-CNN), Single Shot MultiBox Detector (SSD), You Only Look Once (YOLO), Single-Shot Refinement Neural Network for Object Detection (RefineDet), Retina-Net, or Deformable convolutional networks.

Further, in one embodiment, the analysis unit may detect the obstacle or the dangerous situation having a possibility of colliding with the mobile object by analyzing the combined map generated by the generation unit by machine learning means trained based on data of a past risk factor.

Here, the analysis unit may use, as the machine learning means for determining the risk factor, any method such as Linear Regression, Logistic Regression, Decision Trees, Support Vector Machines, Naive Bayes, K-Nearest Neighbor, K-means, Random Forest, and Dimensionality Reduction Algorithms, or Gradient Boosting Algorithms.

Figure 10:
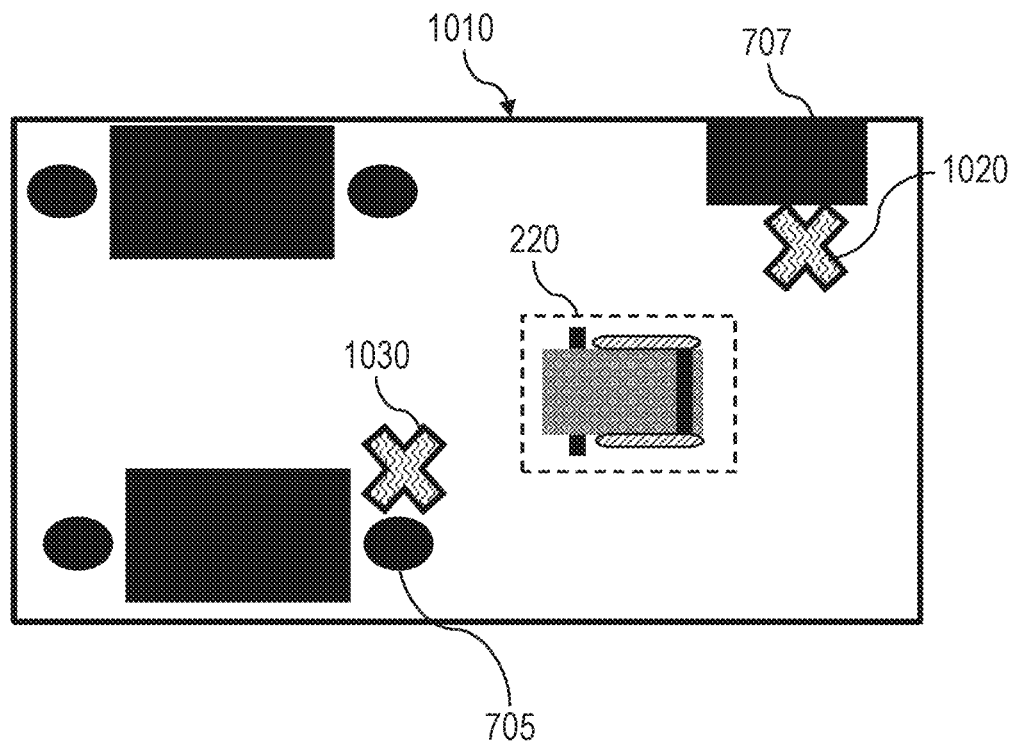
FIG. 10 is a diagram illustrating an example of a combined map reflecting a risk factor according to the embodiment of the present disclosure.

FIG. 10 is a diagram illustrating an example of a combined map 1010 reflecting risk factors 1020 and 1030.

In one embodiment, the analysis unit may reflect the determined risk factor to the combined map.

As an example, when a door of the refrigerator 707 is opened as a result of the analysis unit analyzing the input image received from the sensor group and the combined map generated by the generation unit (for example, the combined map 910 illustrated in FIG. 9), the door is determined as the risk factor 1020 having a possibility of interfering with the movement of the mobile object 220, and the determined risk factor 1020 is reflected to the corresponding region on the combined map 1010.

Further, when a person seated in the chair 705 stands up as a result of the analysis unit analyzing the input image received from the sensor group and the combined map generated by the generation unit, the person is determined as the risk factor 1030 having a possibility of interfering with the movement of the mobile object 220, and the determined risk factor 1030 is reflected to the corresponding region on the combined map 1010.

The risk factors 1020 and 1030 reflected to the combined map 1010 may be visually indicated by a specific code or symbol such as "X" as illustrated in FIG. 10, and may be given as, metadata indicating contents and occurrence coordinates of the risk factors, to the combined map 1010.

In this manner, the mobile object that receives the combined map reflecting the risk factors can determine the safe route to avoid the risk factors by determining the risk factors having the possibility of obstructing the movement of the mobile object and reflecting the risk factors to the combined map 1010.

Figure 11:
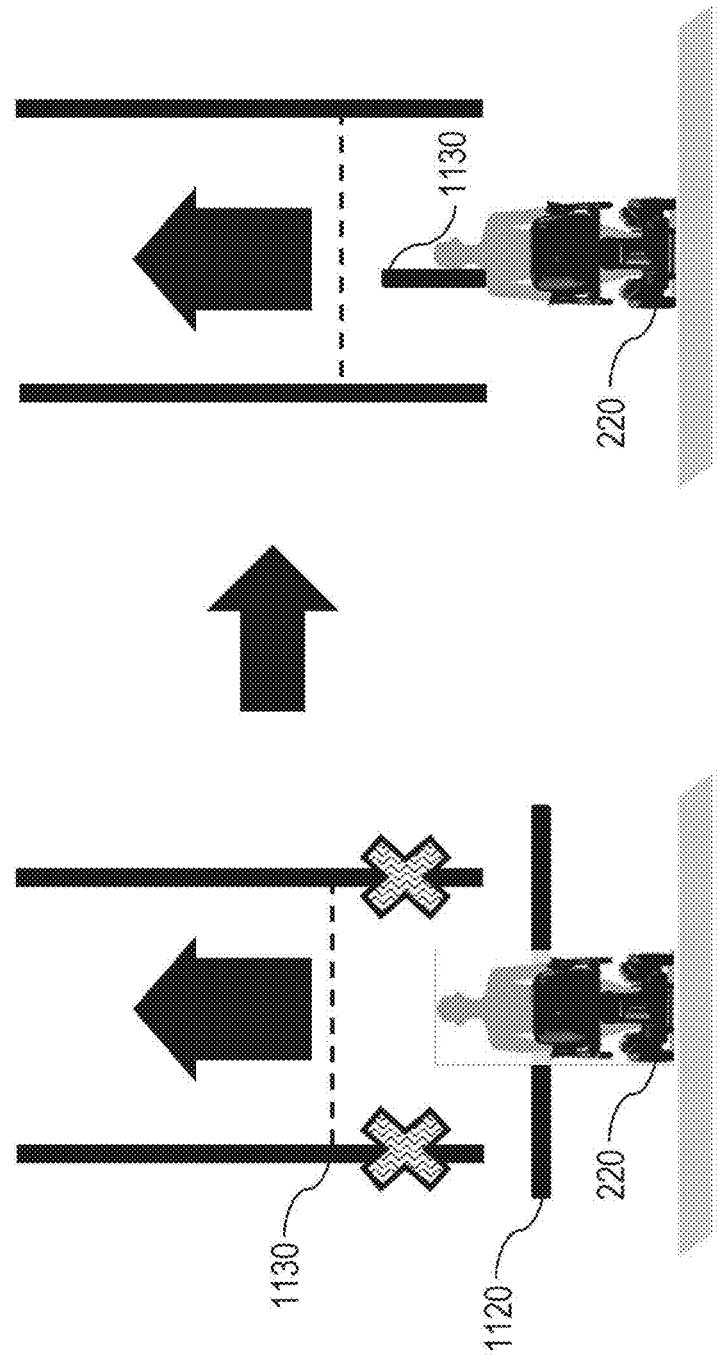
FIG. 11 is a diagram illustrating an example of a risk avoidance instruction to avoid a risk factor according to the embodiment of the present disclosure.

FIG. 11 is a diagram illustrating an example of a risk avoidance instruction to avoid the risk factor.

In one embodiment, the analysis unit may transmit the risk avoidance instruction to avoid the determined risk factor to the mobile object together with the combined map. The risk avoidance instruction mentioned here may be an instruction to control a movement route determined by the mobile object 220, or may be an instruction regarding a behavior of the passenger of the mobile object 220.

As an example, it is assumed that as a result of the analysis unit analyzing the input image received from the sensor group and the combined map generated by the generation unit (for example, the combined map 910 illustrated in FIG. 9), a fact that the passenger cannot pass through a narrow space 1130 in the movement route in a state in which the passenger of the mobile object 220 horizontally holds a luggage 1120 sideways is determined as the risk factor. In this case, the analysis unit may generate the risk avoidance instruction to request that the luggage 1120 is held vertically and may transmit the risk avoidance instruction to the mobile object 220. The risk avoidance instruction mentioned here may be displayed on a screen of a terminal mounted on the mobile object 220, for example, or may be produced from a speaker mounted on the mobile object 220 by voice, warning sound, or the like.

Thereafter, the passenger of the mobile object who receives the risk avoidance instruction can pass through the narrow space 1130 in the movement route by vertically holding the luggage 1120 according to the risk avoidance instruction.

In this manner, the risk factor can be avoided and the safety of the passenger can be improved by transmitting the risk avoidance instruction to avoid the risk factor to the mobile object.

Note that, although the case where the mobile object 220 having the automatic driving function automatically determines the safe route to the destination in the moving region based on the combined map received from the drive assist apparatus has been described as an example, the present disclosure is not limited thereto. The analysis unit of the drive assist apparatus may determine the safe route to the destination for the mobile object 220 by analyzing the input image received from the sensor group and the combined map generated by the generation unit, and may transmit the determined route that reflects the determined route to the mobile object 220.

Further, in one embodiment, the analysis unit of the drive assist apparatus may determine a route in consideration of information included in the service request received from the mobile object. For example, the analysis unit may determine a route matching the intention of the passenger while avoiding the risk factor based on the information on the mobile object (for example, dimensions, a weight, and a maximum speed), the information on the destination of the mobile object, and the information on the intention of the passenger (an intention to avoid a congested route, or an intention to follow a route where an outside scenery can be seen).

Although the embodiment of the present invention has been described above, the present invention is not limited to the above-described embodiment, and various modifications can be made without departing from the gist of the present invention.

What is claimed is:

1. A drive assist apparatus for assisting driving of a mobile object that moves within a moving region, the drive assist apparatus comprising:
  a storage unit that stores at least a three-dimensional model indicating the moving region;
  an input unit that is configured to receive, from a sensor group installed in the moving region via a network, first height information indicating a first height which is a height of the mobile object and second height information indicating a second height which is a height of an object that satisfies a predetermined distance criterion from the mobile object;
  an extraction unit that extracts a first plan view from the three-dimensional model based on the first height information and extracts a second plan view from the three-dimensional model based on the second height information;
  a generation unit that generates a combined map for two-dimensionally showing the moving region and assisting the driving of the mobile object by combining the first plan view and the second plan view; and
  an output unit that is configured to transmit a generated combined map to the mobile object.

2. The drive assist apparatus according to claim 1,
  wherein the extraction unit extracts, as the first plan view, a first plane orthogonal to a height direction of the mobile object and corresponding to the first height from the three-dimensional model, and extracts, as the second plan view, a second plane orthogonal to the height direction of the mobile object and corresponding to the second height from the three-dimensional model,
  wherein the first plan view shows a cross-sectional shape of an object present in the first plane within the moving region, and
  wherein the second plan view shows a cross-sectional shape of an object present in the second plane within the moving region.

3. The drive assist apparatus according to claim 2,
  wherein the generation unit generates, as the combined map, a two-dimensional map showing the cross-sectional shape of the object present in the first plane within the moving region and the cross-sectional shape of the object present in the second plane within the moving region by superimposing the first plan view and the second plan view based on the first height and the second height.

4. The drive assist apparatus according to claim 1,
  wherein the input unit receives third height information indicating a third height which is a height of a luggage carried by a passenger of the mobile object from the sensor group via the network,
  wherein the extraction unit extracts, as a third plan view, a third plane orthogonal to the height direction of the mobile object and corresponding to the third height from the three-dimensional model, and
  wherein the generation unit generates the combined map by combining the first plan view, the second plan view, and the third plan view.

5. The drive assist apparatus according to claim 1, further comprising:
  an analysis unit,
  wherein the input unit receives an input image indicating the moving region or the mobile object from the sensor group via the network,
  wherein the analysis unit determines a risk factor having a possibility that a movement of the mobile object is obstructed by analyzing the input image or the combined map, and
  wherein the generation unit reflects information on the risk factor to the combined map.

6. The drive assist apparatus according to claim 5,
  wherein the analysis unit generates a risk avoidance instruction for avoiding the risk factor, and
  wherein the output unit transmits a combined map to which the information on the risk factor is reflected and the risk avoidance instruction to the mobile object.

7. The drive assist apparatus according to claim 1,
  wherein the mobile object has an automatic driving function.

8. A drive assist method for supporting driving of a mobile object that moves within a moving region, the drive assist method comprising:
  receiving a service request for requesting a drive assist service from the mobile object;
  transmitting a sensor data acquisition instruction via a network to start acquiring sensor data to a sensor group installed in the moving region in which the mobile object moves;
  receiving, from the sensor group via the network, first height information indicating a first height which is a height of the mobile object and second height information indicating a second height which is a height of an object that satisfies a predetermined distance criterion from the mobile object;
  extracting, as a first plan view, a first plane orthogonal to a height direction of the mobile object and corresponding to the first height from a three-dimensional model for three-dimensionally showing the moving region;
  extracting, as a second plan view, a second plane orthogonal to the height direction of the mobile object and corresponding to the second height from the three-dimensional model;
  generating, as a combined map, a two-dimensional map for showing a cross-sectional shape of an object present in the first plane within the moving region and a cross-sectional shape of an object present in the second plane within the moving region by superimposing the first plan view and the second plan view based on the first height and the second height; and
  transmitting a generated combined map to the mobile object.

9. A drive assist system for assisting driving of a mobile object that moves within a moving region, the drive assist system comprising:
- a mobile object that moves within a moving region;
- a sensor group that is installed within the moving region and which is not attached to the mobile object; and
- a drive assist apparatus that assists the driving of the mobile object, wherein
- the mobile object, the sensor group, and the drive assist apparatus are connected via a communication network, and
- the drive assist apparatus includes:
- a storage unit that stores at least a three-dimensional model for three-dimensionally showing the moving region;
- an input unit that receives, via the communication network, first height information indicating a first height which is a height of the mobile object and second height information indicating a second height which is a height of an object satisfying a predetermined distance criterion from the mobile object;
- an extraction unit that extracts a first plan view from the three-dimensional model based on the first height information, and extracts a second plan view from the three-dimensional model based on the second height information;
- a generation unit that generates a combined map for two-dimensionally showing the moving region and assisting the driving of the mobile object by combining the first plan view and the second plan view; and
- an output unit that transmits a generated combined map to the mobile object.

* * * * *